UNITED STATES PATENT OFFICE.

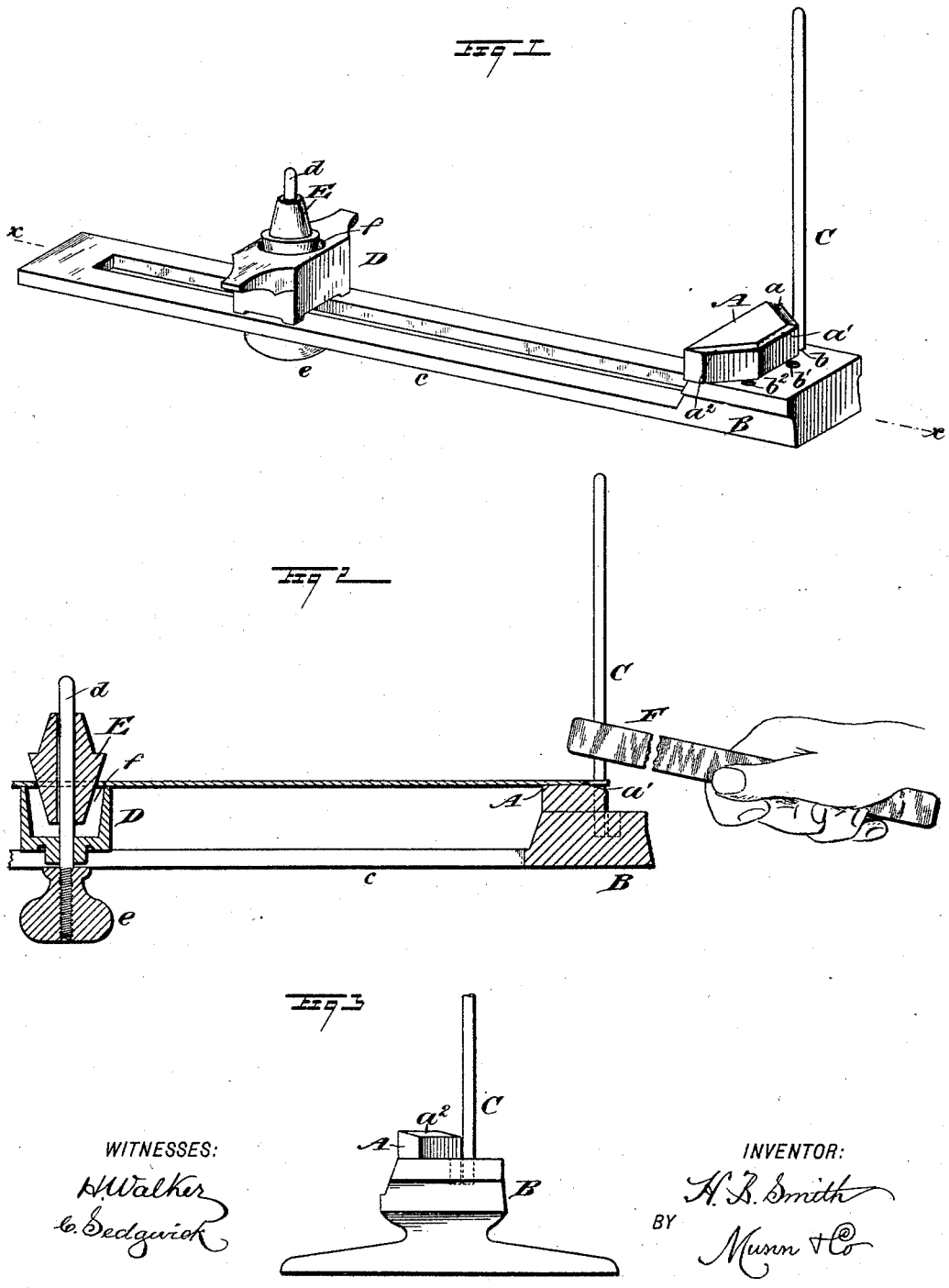

HIRAM B. SMITH, OF ATLANTA, GEORGIA, ASSIGNOR TO THE MILLERS FALLS COMPANY, OF ERVING, MASSACHUSETTS.

SAW-SET.

SPECIFICATION forming part of Letters Patent No. 483,793, dated October 4, 1892.

Application filed February 15, 1892. Serial No. 421,581. (No model.)

*To all whom it may concern:*

Be it known that I, HIRAM B. SMITH, of Atlanta, in the county of Fulton and State of Georgia, have invented a new and Improved Saw-Set, of which the following is a specification, reference being had to the annexed drawings, forming a part thereof, in which—

Figure 1 is a perspective view of my improved saw-set. Fig. 2 is a longitudinal section taken on line $x$ $x$ in Fig. 1, and Fig. 3 shows the saw-setting anvil detached from the circular-saw guide.

Similar letters of reference indicate corresponding parts in all the views.

The object of my invention is to construct a simple and effective device for quickly and accurately setting circular and long saws.

My invention consists in the combination of an anvil having beveled or oval edges, a saw guide and support, a hammer-guide, and a hammer adapted for use in conjunction with the beveled or oval anvil and hammer-guide, all as will be hereinafter more fully described.

The anvil A, which is preferably made in semi-octagonal form, is provided with beveled or oval edges $a$ $a'$ $a^2$, and the said anvil is formed on or attached to the support B, the said support being provided with parallel sides adapted for insertion in a bench-vise. The base B is provided with holes $b$ $b'$ $b^2$ for receiving the rod C, forming the hammer-guide, the said rod being supported at right angles to the plane of the face of the anvil A. The holes $b$ $b'$ $b^2$ are made opposite the faces of the anvil, so that the rod will guide the hammer when used in connection with either of the beveled edges $a$ $a'$ $a^2$.

When the implement is used for setting circular saws, the base B is prolonged to form a slotted arm $c$, to which is fitted the adjustable circular-saw support D, the said support having a boss which enters into the slot of the arm $c$. A rod $d$ extends through the boss of the support D, and upon its threaded lower end, below the arm $c$, is placed a hand-nut $e$, by means of which the support D may be clamped in any position along the length of the slotted arm. In the top of the support D and concentric with the rod $d$ is made a cavity $f$ for receiving the end of the conical bushing E, the said bushing being formed of two truncated cones arranged base to base, thus forming a double bushing for circular saws having large and small central apertures. The bushing E is bored longitudinally, so as to fit upon the rod $d$.

The hammer consists of a flat bar F of steel, which is used by placing the flat side against the vertical guide-rod C and striking a tooth of the saw adjoining the guide-rod C. In this manner alternate teeth of the saw are set as it is moved forward, and when one series of teeth have been set the saw is reversed and the intermediate teeth are set in the opposite direction in the same manner, the guide-rod C being shifted to permit of working on the beveled edge of the anvil, which is suited to the inclination of the teeth to be set.

In setting long saws the anvil, the hammer-guide, and the hammer only are used, and where the implement is to be used for this purpose only the slotted bar $c$ and the support D may be dispensed with. The teeth of the saw may be guided in such cases by one or more gages of the kind commonly used for saw-sets, to be suitably attached to the anvil, and which require no special description.

Having thus described my invention, I claim as new and desire to secure by Letters Patent—

1. The combination, with the anvil having a plurality of beveled or rounding edges and a plurality of apertures, of a guide-rod the lower end of which engages any one of said apertures, according to which edge of the anvil is in use, substantially as set forth.

2. In a saw-set, a support or base provided on its upper side with a series of apertures and an anvil having beveled or oval edges, one for each hole, whereby a guide-rod may be inserted in any one of the holes, substantially as set forth.

3. The combination, with the anvil having a series of beveled or oval edges and a base projecting therebeyond, of a vertical rod adjustable on the said base to any one of said edges, substantially as set forth.

4. In a saw-set, the combination of the anvil A, provided with beveled or oval edges $a$ $a'$ $a^2$, the anvil-support B, provided with apertures for receiving the hammer-guide and furnished with a slotted arm $c$, the hammer-guide rod C, and the adjustable saw-support D, provided with the rod $d$, and the conical bushing E, substantially as described.

HIRAM B. SMITH.

Witnesses:
H. T. RUSS,
W. A. GREGG.